(12) United States Patent
Velusamy et al.

(10) Patent No.: US 9,398,508 B1
(45) Date of Patent: Jul. 19, 2016

(54) METHOD AND SYSTEM FOR CONTROLLING HANDOVER

(71) Applicant: Sprint Spectrum L.P., Overland Park, KS (US)

(72) Inventors: Saravana Velusamy, Olathe, KS (US); Sreekar Marupaduga, Overland Park, KS (US); Ryan P. Dreiling, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 38 days.

(21) Appl. No.: 14/570,118

(22) Filed: Dec. 15, 2014

(51) Int. Cl.
*H04W 36/30* (2009.01)

(52) U.S. Cl.
CPC .................................... *H04W 36/30* (2013.01)

(58) Field of Classification Search
CPC ..... H04W 36/30; H04W 36/18; H04W 36/08; H04W 36/14; H04W 36/12
See application file for complete search history.

(56) References Cited

U.S. PATENT DOCUMENTS

| 2012/0014357 A1* | 1/2012 | Jung ..................... H04L 5/0035 370/332 |
| 2013/0273918 A1* | 10/2013 | Watanabe ......... H04W 36/0055 455/436 |
| 2014/0023045 A1* | 1/2014 | Li ..................... H04W 36/0055 370/331 |
| 2015/0181470 A1* | 6/2015 | Chai ................. H04W 36/0005 455/438 |

* cited by examiner

*Primary Examiner* — Ted Wang

(57) ABSTRACT

One embodiment takes the form of a method carried out by a handover source while the handover source is serving a UE with communication service at a quality of service level. The method includes the handover source transmitting, to a first handover target, a first handover request including an indication of the quality of service level. Next, in response to the transmitted first handover request, the handover source receives from the first handover target a response indicating that the first handover target does not support the quality of service level, but specifying a second handover target that supports the quality of service level. The handover source may then transmit to the specified second handover target a second handover request seeking handover of the UE from being served by the handover source to being served by the second handover target.

18 Claims, 4 Drawing Sheets

METHOD AND SYSTEM FOR CONTROLLING HANDOVER

BACKGROUND

Unless otherwise indicated herein, the description provided in this section is not itself prior art to the claims and is not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

When a UE first enters into the coverage of a cellular wireless network, the UE engages in a process of registering or "attaching" with the network, which may trigger setup of various communication channels for the UE and/or reservation of various communication resources for the UE. For instance, upon first detecting coverage of a base station, the UE may transmit an attach request message to the base station, which the base station may forward to a network controller such as a mobility management entity (MME). Upon authenticating and authorizing the UE, the network controller may then engage in further signaling with the base station and with a serving gateway (SGW), which may in turn engage in signaling with a packet data network gateway (PGW), ultimately resulting in setup of one or more bearer connections or "bearers" each extending, via the base station, between the UE and the PGW, through which the UE can then engage in packet-data communication via the PGW.

Each bearer established for a UE may define a logical communication tunnel that includes a radio bearer portion extending between the UE and the base station, and an access bearer portion extending between the base station and the PGW via the SGW. Further, each bearer may have a designated quality of service level, which may dictate how the packet data transmission along the bearer is handled by the network. For instance, a bearer could have a relatively high quality of service level, according to which network nodes (such as the base station, SGW, and various routers) along the bearer path could be set to prioritize routing of data on the bearer over routing of data on other bearers, perhaps to guarantee a particular minimum bit rate, a particular maximum level of packet delay, and/or a particular maximum level of packet loss. Alternatively, a bearer could have a relatively low quality of service level, such as a "best efforts" service level, according to which nodes along the bearer path would simply do their best to route data of the bearer, subject to higher priority handling of other bearer traffic.

In practice, a network such as this may initially establish for a UE one or more default bearers to enable the UE to engage in certain basic communications, with each default bearer having a respective quality of service level. By way of example, the network may initially establish for the UE a default Internet bearer with a best-efforts quality of service level, for use by the UE to engage in general Internet communications such as web browsing, e-mail messaging, and the like. Further, if the UE subscribes to voice over Internet Protocol (VoIP) service or another such service that would be served by an Internet Multimedia Subsystem (IMS) platform, the network may initially establish for the UE a default IMS signaling bearer with a medium quality of service level, for use by the UE to engage in session setup signaling (such as Session Initiation Protocol (SIP) signaling) with the IMS to facilitate setup of VoIP calls or the like.

As the UE is served by the network, the network may also establish for the UE additional bearers as needed. For example, if the UE has an IMS signaling bearer and the UE engages in signaling over that bearer with an IMS to set up a packet-based real-time media session such as a VoIP call, the network may then establish for the UE a dedicated IMS bearer with a high quality of service level, for carrying media content of the session, such as VoIP voice packets, to and from the UE. Once the dedicated IMS bearer is established, the UE may then send and receive media content of the session over that dedicated IMS bearer.

When a UE is served by a base station, the UE may regularly monitor the reference signal from that base station and reference signals from other base stations in the vicinity, to help ensure that the UE continues to operate in a most appropriate coverage area. If the UE finds that one or more other base stations provide sufficiently strong coverage, perhaps sufficiently stronger than the UE's currently serving base station, then the UE may initiate handover. For instance, the UE may transmit to its serving base station a measurement report that specifies the one or more detected coverage areas and, for each such coverage area, the detected signal strength. The serving base station (source base station) and/or associated network infrastructure may then decide based on the UE's measurement report to process a handover of the UE to a particular base station (target base station) from which the UE detected sufficiently strong signal strength.

OVERVIEW

A problem that can arise in a cellular wireless network is that, if the network has established for the UE a bearer of a particular quality of service level when the UE is in a particular base station coverage area and the UE then moves into another base station coverage area that does not support bearers of that particular service level, handover of the UE between the coverage areas may fail. For instance, when the network attempts to transfer the established bearer from being via a source base station coverage area to being via a target base station coverage area, the network may determine that the target base station coverage area does not support the bearer's quality of service level and may, in response, discontinue the transfer of that bearer. Consequently, as the UE moves into the target base station coverage area, the UE may no longer have use of that established bearer. For VoIP calls and other such ongoing sessions, this can be a particular issue from a user-experience standpoint.

Disclosed herein are methods and systems to help overcome this issue. In accordance with the disclosure, a UE is served by a source base station with communication service at a particular quality of service level. The UE may then move into a target base station coverage area, and the source base station may responsively transmit a handover request message to the target base station including an indication of the particular quality of service level. The quality of service level may be designated by a respective quality of service class indicator (QCI), for example. The target base station may then determine that the target base station cannot support the particular quality of service level, and may then responsively determine a second target base station that can support at least the indicated quality of service level. The target base station may then respond to the source base station with an indication of the determined second target base station. In turn, the source base station may then direct the UE to scan for coverage of the specified second target base station, and if the UE finds sufficient coverage, the source base station then initiates a new handover process to facilitate handover from the source base station to the second target base station.

In one example of this process, the UE may request handover to a first handover target (e.g., a first base station and/or MME to which the UE will hand over) based on signal strength of an air interface between the first handover target and the UE. The first handover target may then determine that it does not support the UE's current quality of service level, and the handover source will responsively direct the UE to scan for a second handover target that the first handover target determines would support the UE's current quality of service level. The UE then finds the second handover target and signals to its serving system to trigger handover to the second handover target. Such a process may increase the probability that handover will be successful, resulting in uninterrupted service for VoIP calls and other such ongoing sessions.

Accordingly, in one respect, disclosed is a method operable by a handover source while the handover source is serving a user equipment device (UE) with communication service at a quality of service level. In accordance with the method, the handover source transmits to a first handover target a first handover request seeking handover of the UE from being served by the handover source to being served by the first handover target, where the first handover request includes an indication of the quality of service level. In response to the transmitted first handover request, the handover source receives from the first handover target a response indicating that the first handover target does not support the quality of service level. The response also specifies a second handover target that supports the quality of service level. In response to the response received from the first handover target, the handover source then transmits to the specified second handover target a second handover request seeking handover of the UE from being served by the handover source to being served by the second handover target.

In another respect, disclosed is a structure configured to facilitate implementation of the disclosed method. The disclosed structure may take the form of a first serving system that includes (a) a wireless communication interface configured to communicate with a UE over an air interface at a quality of service level, (b) a processing unit, (c) data storage, and (d) program instructions stored in the data storage and executable by the processing unit to carry out various operations. The operations may include transmitting from the first serving system to a second serving system a first handover request seeking handover of the UE from being served by the first serving system to being served by the second serving system, where the first handover request includes an indication of the quality of service level. The operations may also include receiving from the second serving system, in response to the transmitted first handover request, a response indicating that the second serving system does not support the quality of service level. The response also specifies a third serving system that supports the quality of service level. The operations may also include, in response to the response received from the second serving system, transmitting to the specified third serving system a second handover request seeking handover of the UE from being served by the first serving system to being served by the third serving system.

Further, in another respect, disclosed is a wireless communication system that includes a first base station for providing first cellular coverage in which to serve UEs, a second base station for providing second cellular coverage in which to serve UEs, and a third base station for providing third cellular coverage in which to serve UEs. In accordance with the disclosure, the first base station serves a UE at a quality of service level, and the first base station includes a first controller configured to (i) transmit a first handover request to the second base station, wherein the first handover request includes an indication of the quality of service level, (ii) receive a response from the second base station indicating that the second base station does not support the quality of service level, (iii) receive from the second base station an indication of the third base station, where the third base station supports the quality of service level, and (iv) transmit a second handover request to the third base station. In addition, the second base station includes a second controller configured to (i) receive from the first base station the first handover request, (ii) determine whether the second base station supports the quality of service level, and (iii) in response to a determination that the second base station does not support the quality of service level, transmit the indication of the third base station to the first base station. Further, the third base station includes a third controller configured to (i) receive the second handover request from the first base station, and (ii) receive handover of the UE from being served by the first base station to being served by the third base station.

These and other aspects will become apparent to those of ordinary skill in the art by reading the following detailed description, with reference where appropriate to the accompanying drawings. Further, it should be understood that the embodiments noted herein are not intended to limit the scope of the claims.

DETAILED DESCRIPTION

In general, a wireless communication system may operate in accordance with a particular air interface protocol or "radio access technology," with communications from the base stations to mobile terminals defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EVDO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

The present method and system will be described herein by way of example with respect to an LTE network. It should be understood, however, that principles of the disclosure can apply in connection with other types of networks as well.

Further, even in the context of LTE, it should be understood that variations from the disclosed examples are possible. For instance, features can be added, omitted, combined, distributed, repositioned, and/or re-ordered. In addition, it should be understood that features described as being carried out by one or more entities can be implemented by hardware, firmware, and/or software, such as by a computer programmed with program instructions executable to carry out the described features.

Figure 1:
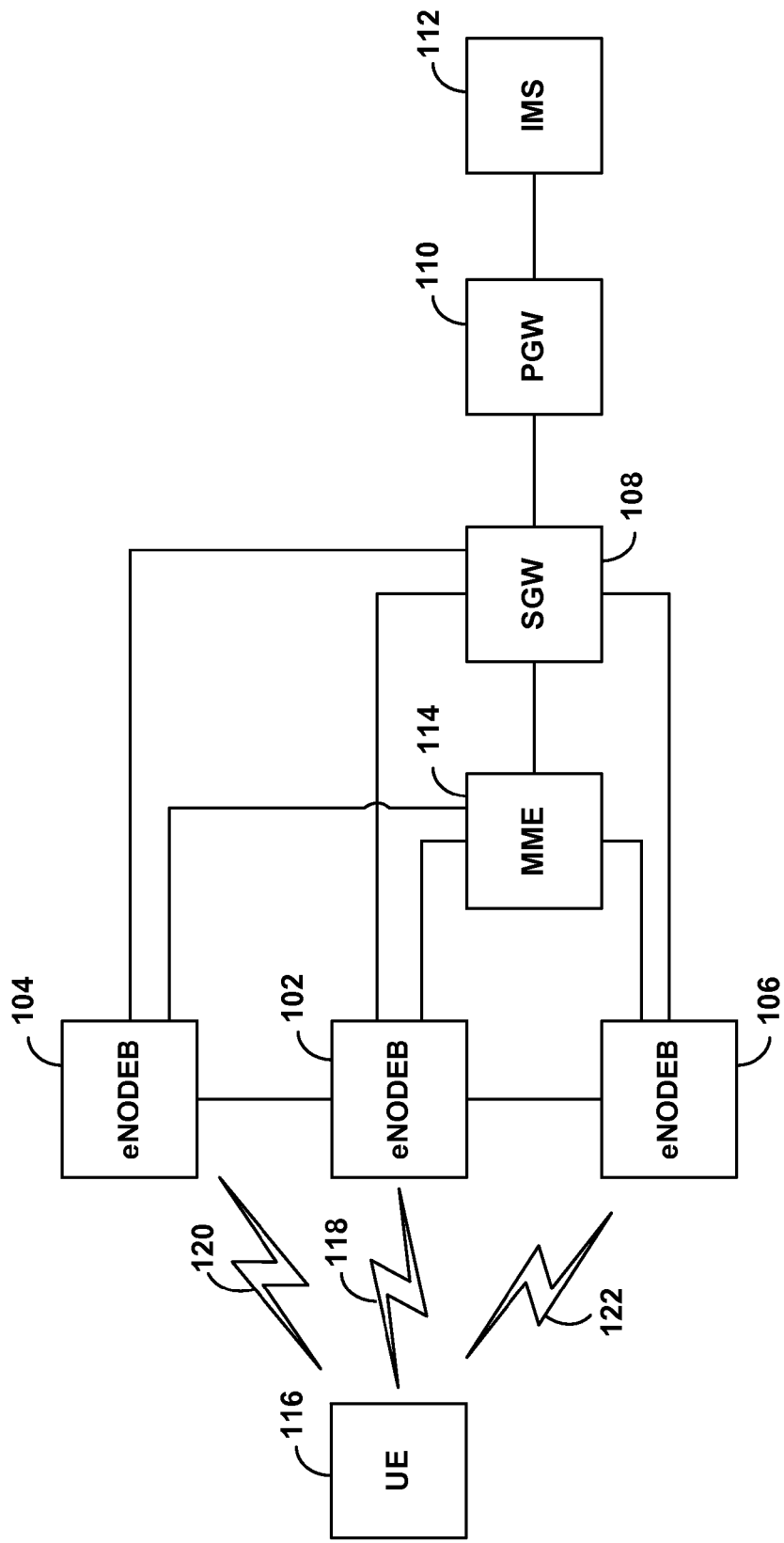
FIG. 1 is a simplified block diagram of an example wireless communication system in which features of the present disclosure can be implemented.

Turning to the figures, FIG. 1 is a simplified block diagram of an example LTE network in which the disclosed features can be implemented. In the LTE network, each base station is referred to as an evolved Node-B or eNodeB. As shown in FIG. 1, the example network includes a first eNodeB 102, a second eNodeB 104, and a third eNodeB 106, with each eNodeB radiating to provide a respective coverage area (e.g., an LTE cell). Each eNodeB is shown by way of example having a communication interface with an SGW 108, which in turn has a communication interface with a PGW 110 that is in communication with an IMS 112. Further, each eNodeB is also shown having a communication interface with an MME 114, which in turn has a communication interface with the SGW 108. Each eNodeB is configured to serve UE 116 over a distinct air interface that defines various channels of communication between UE 116 and the eNodeBs. At any given time, only one of the eNodeBs may serve UE 116. As shown in FIG. 1, the first eNodeB 102 serves UE 116 via air interface 118, the second eNodeB 104 serves UE 116 via air interface 120, and the third eNodeB 106 serves UE 116 via air interface 122.

In practice, the network nodes shown in FIG. 1 may all sit as nodes on one or more packet-switched networks, such as a wireless service provider's core packet network. Thus, the interfaces between the various nodes may be logical interfaces through which the nodes may engage in packet-switched communication with each other. By way of example, the lines shown connecting various elements could take various forms (e.g., wireless, wired, circuit-switched, packet-switched, direct, indirect, etc.), including various intervening entities such as routers, gateways, and the like. In one example, the first eNodeB 102 may be in communication with eNodeB 104 and eNodeB 106 via a wired X2 interface. In another example, communication between eNodeBs occurs indirectly via MME 114.

In this simplified arrangement, UE 116 may initially detect that it is within coverage of eNodeB 102 and may responsively engage in an attach process with eNodeB 102. In line with the discussion above, for instance, UE 116 may transmit an attach request message over air interface 118 to eNodeB 102, which may cause the network to authenticate UE 116 and to establish one or more bearers for UE 116. This establishment of bearers may be initiated by the UE or may be initiated by the LTE network. Further, the process may involve establishing a Radio Resource Control (RRC) connection defining a radio-link-layer connection between UE 116 and eNodeB 102, and at least one logical bearer between UE 116 and PGW 110, with the bearer including a radio portion extending between UE 116 and eNodeB 102 and an access portion extending between eNodeB 102 and PGW 110 via SGW 108.

In practice, the network may initially establish for UE 116 one or more default bearers to enable UE 116 to engage in certain basic communication, with each default bearer having a respective quality of service level. For instance, the network may initially establish for UE 116 a default bearer (e.g., a best-efforts bearer) for carrying general Internet communications and an IMS signaling bearer for carrying application-layer signaling between UE 116 and IMS 112. In this state, UE 116 and IMS 112 may thus engage in signaling with each other via the UE's IMS signaling bearer to establish a VoIP call or other such media session, and, when that session is being set up, PGW 110 may invoke establishment for UE 116 of a dedicated IMS bearer for use to carry media content of the session between UE 116 and PGW 110. Once the session and bearer are set up, UE 116 may then engage in the session, with media content of the session flowing between UE 116 and IMS 112 (or between UE 116 and another party) via the UE's dedicated IMS bearer.

In one example, the quality of service level may include a quality of packet communication between UE 116 and PGW 110 (e.g., a minimum bit rate, a maximum level of packet delay, a maximum level of data loss, etc.). Alternatively or additionally, the quality of service level may include a QCI value defining the quality of packet communication. For instance, in an LTE implementation, QCI numbers may range from 1 to 9, with each QCI number corresponding to a quality of service level. QCI numbers may further correspond to one or more type of service such as conversational voice, conversational video, real-time gaming, buffered video streaming, email, chat, etc.

Such a QCI level can be designated at the time of establishment of the particular bearer and/or can be designated after establishment of the particular bearer. For example, in some UE-initiated bearer establishment scenarios, when UE 116 transmits an initial attach request to the eNodeB 102 to establish a particular bearer, UE 116 may specify in the attach request a QCI level for the particular bearer. In response to the eNodeB 102 receiving the attach request, the LTE network may establish the particular bearer and begin serving UE 116 at the quality of service level associated with the QCI level. For instance, UE 116 may specify in the attach request a QCI level 5, and the LTE network may responsively establish a bearer with that QCI level, and UE 116 can communicate over that bearer accordingly. During or after establishment of the particular bearer, MME 114 or another entity of the LTE network may assign a bearer ID for the particular bearer. The eNodeB 102 may then store, in a context record for the particular bearer (keyed to the particular bearer's bearer ID), a specification of the QCI level of the particular bearer.

As another example, once one or more bearers are established for UE 116, eNodeB 102 and UE 116 may engage in further signaling that may indicate to eNodeB 102 a QCI level of bearer traffic that may be communicated on the established bearer(s). For instance, at some point while eNodeB 102 is serving UE 116 on a particular established bearer that can support one or more different content types of bearer traffic, the LTE network and UE 116 can engage in RRC signaling to reconfigure one or more radio-link portions of the particular bearer. By way of example, the UE may transmit to the eNodeB an "RRC Connection Reconfiguration" message for the particular bearer that specifies a bearer ID for the particular bearer and indicates a particular QCI level of bearer traffic supported by the particular bearer. The eNodeB 102 may then store the indicated particular QCI level in a context record for the particular bearer (keyed to its bearer ID).

It should be understood that the quality of service level may be designated to or otherwise learned by the eNodeB 102 in other manners. For example, a network entity in the data communication path (e.g., the eNodeB 102, MME 114, SGW 108, or PGW 110) may perform deep packet inspection to learn the quality of service level. Namely, that network entity may read the payload of one or more packets transmitted between UE 116 and the packet-switched network over a particular bearer and programmatically determine that the payload indicates the quality of service level of bearer traffic. In scenarios where that network entity is not the eNodeB, for instance, that network entity may then inform the eNodeB that the payload indicates the quality of service level of bearer traffic. Other examples are possible as well.

As discussed above, the wireless network may include additional eNodeBs 104, 106 that provide air interfaces 120, 122 neighboring air interface 118. As discussed above, as UE 116 is served by eNodeB 102, UE 116 regularly monitors a downlink reference signal from eNodeB 102 and from other base stations in the vicinity, to help ensure that the UE continues to operate in a most appropriate coverage area. If UE 116 detects that eNodeB 104 provides coverage sufficiently stronger than eNodeB 102, the network may trigger handover of UE 116 from being served by eNodeB 102 over air interface 118 to being served by eNodeB 104 over air interface 120.

In practice, when UE 116 moves from the coverage area of eNodeB 102 to the coverage area of eNodeB 104, UE 116 may detect sufficiently strong coverage of eNodeB 104 and report such coverage to eNodeB 102. In response, eNodeB 102 may transmit a handover request to eNodeB 104, seeking handover of UE 116 from being served by eNodeB 102 to being served by eNodeB 104. In one example, eNodeB 102 may transmit such a handover request via an inter-eNodeB X2 interface to eNodeB 104 to prepare eNodeB 104 to receive handover of UE 116. In another example, the handover request may be an S1-based handover where communication between eNodeB 102 and eNodeB 104 occurs indirectly via MME 114. Other examples are possible as well.

In accordance with the present method, the handover request transmitted from eNodeB 102 to eNodeB 104 may include an indication of a quality of service level at which the source eNodeB 102 is currently serving UE 116, as discussed above. In particular, the indication of the quality of service level may be a QCI level. As discussed above, eNodeB 102 may determine the QCI level from a context record keyed to the bearer ID of the bearer used to serve UE 116. In response to the handover request between the source eNodeB 102 and target eNodeB 104 and the indicated quality of service level, the target eNodeB 104 may then determine whether the target eNodeB 104 supports the indicated quality of service level that UE 116 has with the source eNodeB 102. Target eNodeB 104 may determine whether the target eNodeB 104 supports the indicated quality of service level by comparing the received indication of the quality of service level in the handover request with a quality of service level stored in the data storage of target eNodeB 104. For example, the data storage of target eNodeB 104 may include information indicating that eNodeB 104 only supports QCI 9 bearers. Target eNodeB 104 may then compare the QCI level indicated in the handover request with QCI 9 to determine whether the target eNodeB 104 supports the indicated quality of service level. For example, if the indicated quality of service is also QCI 9, target eNodeB 104 would determine that it supports the indicated quality of service level that UE 116 has with the source eNodeB 102. On the other hand, if the indicated quality of service level is QCI 1, target eNodeB 104 would determine that it does not support the indicated quality of service level that UE 116 has with the source eNodeB 102.

If the target eNodeB 104 determines that the target eNodeB 104 supports the quality of service level that UE 116 has with the source eNodeB 102, then the target eNodeB 104 may prepare the target eNodeB 104 to receive handover of UE 116 from being served by the source eNodeB 102 to being served by the target eNodeB 104. Upon preparing for handover of UE 116, the target eNodeB 104 may transmit to the source eNodeB 102 a handover request acknowledge message that carries information for use by UE 116 to engage in communication with the target eNodeB 104. The source eNodeB 102 then transmits that information to UE 116 in an RRC Connection Reconfiguration message that functions as a handover directive to cause UE 116 to hand over to the target eNodeB 104.

Alternatively, if the target eNodeB 104 determines that the target eNodeB 104 does not support the quality of service level that UE 116 has with the source eNodeB 102, then the target eNodeB 104 will transmit a response to eNodeB 102 indicating that the target eNodeB 104 does not support the indicated quality of service level. In addition, the response will specify a second handover target, such as eNodeB 106, that can support the indicated quality of service level that UE 116 has with the source eNodeB 102. In particular, the target eNodeB 104 may transmit to the source eNodeB 104 a handover rejection message indicating that handover of UE 116 from the source eNodeB 102 to the target eNodeB 104 has failed. In such an example, the first target eNodeB 104 may specify the second handover target eNodeB 106 in the handover rejection message. Further, the target eNodeB 104 may maintain a list of base stations of nearby wireless coverage areas, including an indication of a quality of service level available for each such base station. As such, the target eNodeB 104 may consult the list of base stations to find the specified second handover target that supports the quality of service level. The response from the first handover target may specify the second handover target by providing a Physical Cell ID (PCI) corresponding to the second handover target, as an example. The source eNodeB 102 may then direct UE 116 to scan for coverage of the specified second target eNodeB 106, and if UE 116 finds sufficient coverage, the specified target eNodeB 106 may then initiate a new handover process to facilitate handover of UE 116 from being served by the source eNodeB 102 to being served by the second target eNodeB 106.

Figure 2:
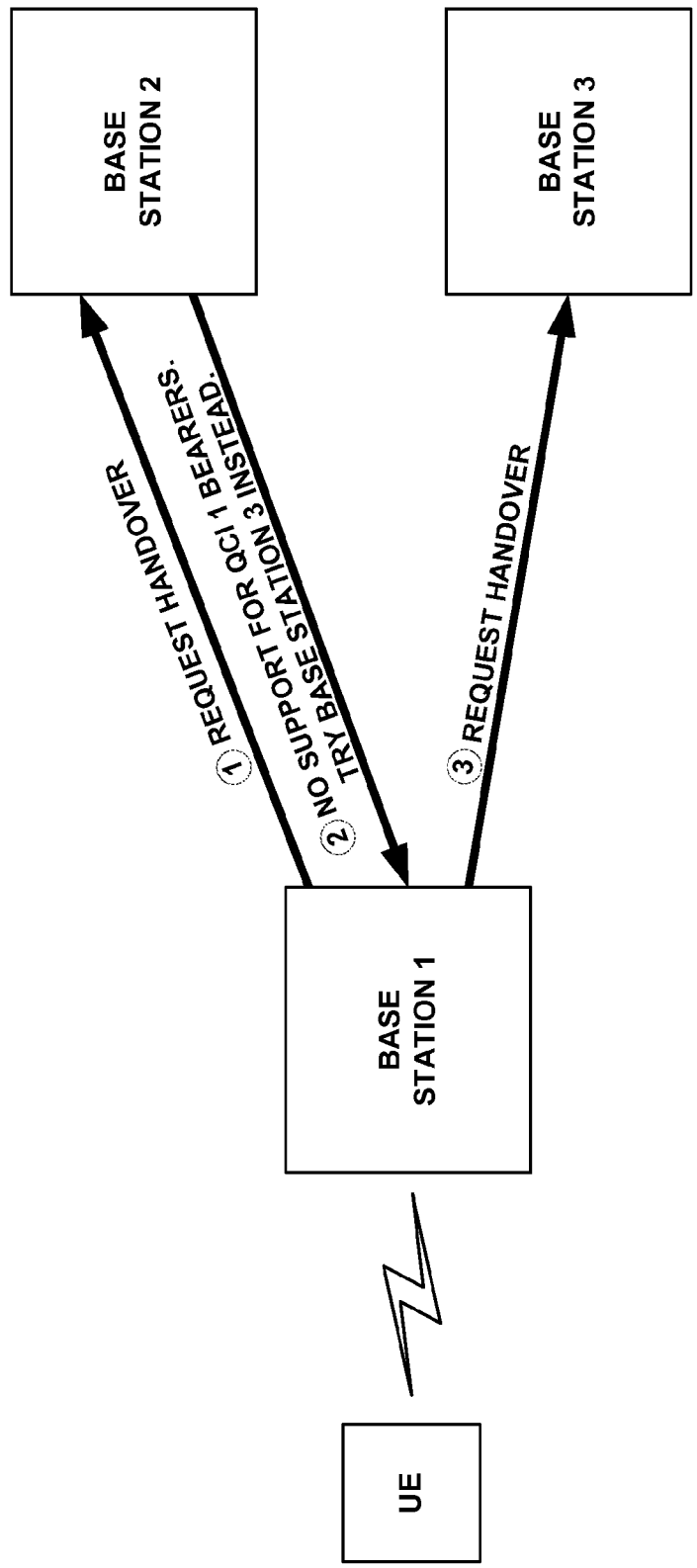
FIG. 2 is a simplified block diagram that depicts operations that can be carried out in accordance with the disclosure.

FIG. 2 is a simplified block diagram that depicts operations of an example embodiment of the disclosed method. In particular, FIG. 2 depicts example signaling that could be used to facilitate the described method in practice. An example UE may attach with base station 1, and may thus be served with wireless communication service by base station 1. Base station 1 provides wireless communication service to the UE with a quality of service level designated QCI 1. The UE then determines that base station 2 provides coverage sufficiently stronger than base station 1, and the UE reports this determination to base station 1. In response, as shown in FIG. 2 at step 1, base station 1 transmits a handover request to base station 2. The handover request includes information indicating that the UE is being served by base station 1 via a QCI 1 bearer.

In response to the transmitted handover request, base station 2 transmits a response indicating that base station 2 does not support QCI 1 bearers, as shown in step 2. The response further specifies a second handover target, base station 3, that does support QCI 1 bearers. In response to the response received from base station 2, base station 1 then transmits to base station 3 a handover request seeking handover of the UE from being served by base station 1 to being served by base station 3, as shown in step 3. Base station 1 then directs the UE to scan for coverage of base station 3, and if the UE finds sufficient coverage, base station 3 then initiates a new handover process to facilitate handover of the UE from being served by base station 1 to being served by base station 3.

Figure 3:
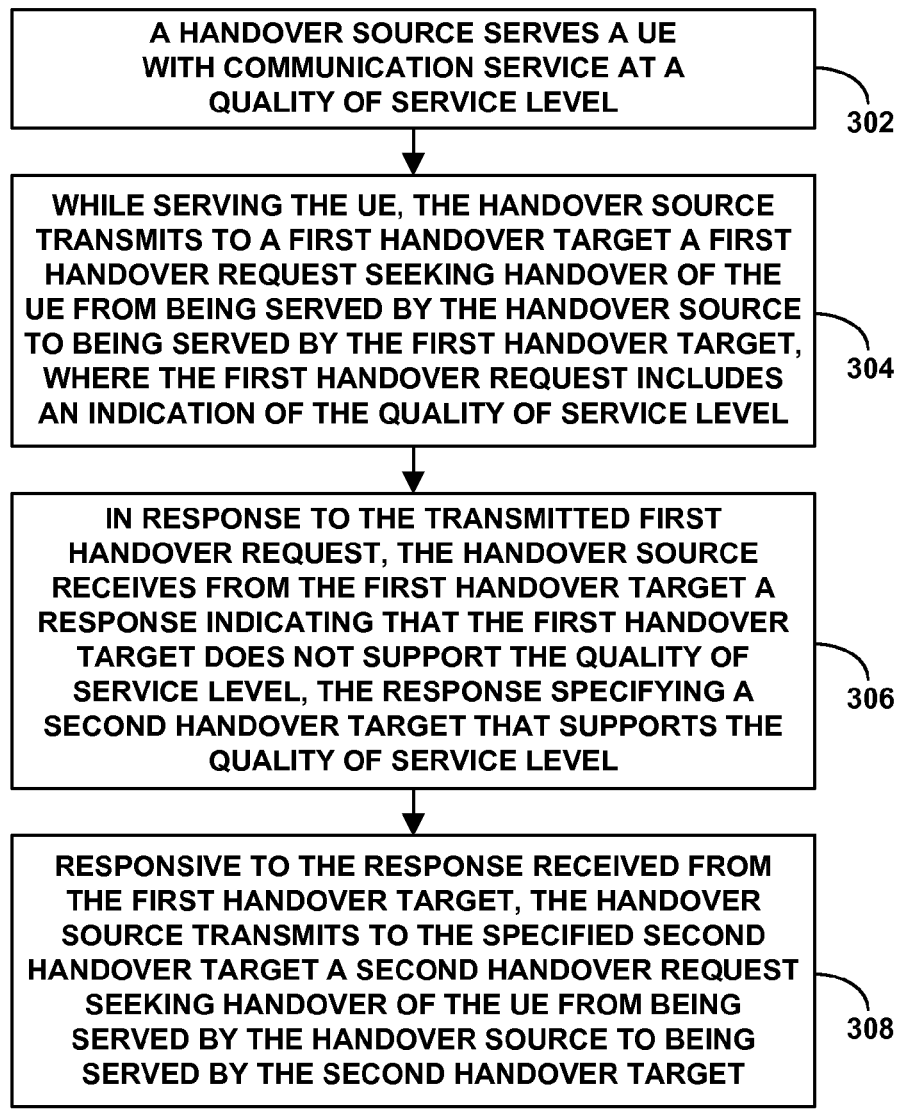
FIG. 3 is a flow chart depicting operations that can be carried out in accordance with the disclosure.

Turning now to FIG. 3, a flow chart illustrating various operations that can be carried out in accordance with an example embodiment of the disclosed methods is shown.

These operations may be carried out by one or more components of a wireless communication network, such as the LTE network of FIG. 1 above.

In this method, the handover source can be a base station such as eNodeB 102, and the handover targets can also be base stations, such as one of eNodeBs 104, 106. Alternatively, the handover source could be more generally any system (e.g., radio access network and/or one or more components of such a network, such as an MME) that is currently serving the UE, and the handover target can be any system (e.g., another radio access network and/or one or more components of such a network, such as an MME) to which the UE can hand over. As between eNodeBs, as discussed above, communication can occur via an X2 interface, or in another manner, such as an S1-based handover where communication between base stations occurs indirectly via an MME or the like.

As shown in FIG. 3, the example embodiment may begin at block 302 with a handover source serving a UE with communication service at a quality of service level. As discussed above, the quality of service may be identified with a QCI level stored in a context record keyed to the bearer ID of the bearer used by the handover source to serve the UE. Other indicators of quality of service level are possible as well.

At block 304, the method continues with the handover source transmitting to a first handover target a first handover request seeking handover of the UE from being served by the handover source to being served by the first handover target. In particular, when the UE moves from the coverage area of the handover source to the coverage area of the first handover target, the UE may determine a signal strength (e.g., reference signal receive strength, or signal-to-noise ratio) of the air interface between the UE and the first handover target, and the UE may report the determined signal strength to the handover source. If the determined signal strength exceeds a threshold, then the handover source may then transmit the first handover request to the first handover target, as discussed above. However, if the determined signal strength does not exceed the threshold, then the handover source may not transmit the first handover request to the first handover source, and may instead search for a different handover target.

As discussed above, the handover source may include an indication of the quality of service level in the first handover request. The indication of the quality of service level may be a QCI level, as an example. The handover source may store the QCI level in a context record for the particular bearer (keyed to its bearer ID) used to serve the UE. When the handover source transmits to the first handover target the first handover request, the handover source may include the stored QCI level in a data packet header of the first handover request. In another example, the handover source may include the stored QCI level in a payload of the first handover request. Other examples are possible as well.

To facilitate UE handover, the handover source may refer to a neighbor list that specifies base stations neighboring the handover source (e.g., a neighbor list that is useable to facilitate UE handover). Such a neighbor list may further specify various information about each neighbor, such as the respective geographic location of the neighbor and the respective coverage area identifier assigned to the neighbor. In practice, the UE may report detecting sufficient signal strength of one or more neighboring base stations to the handover source. The handover source may then use the neighbor list to verify legitimacy for handover of the UE from being served by the handover source to being served by one of the neighboring base stations. In another example, the handover source may select a neighboring base station from the neighbor list that has the highest signal strength for handover.

At block 306, the method continues with the handover source receiving, in response to the first handover request, a response from the first handover target indicating that the first handover target does not support the quality of service level. The response further specifies a second handover target that does support the quality of service level. As discussed above, the first handover target may maintain a list of base stations of nearby wireless coverage areas, including an indication of a quality of service level available for each such base station. The first handover target may consult the list of base stations to find the specified second handover target that supports the indicated quality of service level. Similar to the first handover target, the specified second handover target will be a neighbor of the handover source.

At block 308, the method continues with the handover source, in response to the response received from the first handover target, transmitting to the second specified handover target a second handover request seeking handover of the UE from being served by the handover source to being served by the second handover target. The handover source may then direct the UE to scan for coverage of the specified second handover target, and if the UE finds sufficient coverage, the second handover target may then initiate a new handover process to facilitate handover of the UE from the handover source to the second handover target. In one example, the second handover target may then transmit to the handover source a handover request acknowledge message that carries information including an identifier, such as a C-RNTI identifier, for use by the UE to engage in communication with the second handover target. The handover source may then transmit that information to the UE in an RRC Connection Reconfiguration message that functions as a handover directive to cause the UE to hand over from being served by the handover source to being served by the second handover target.

Figure 4:
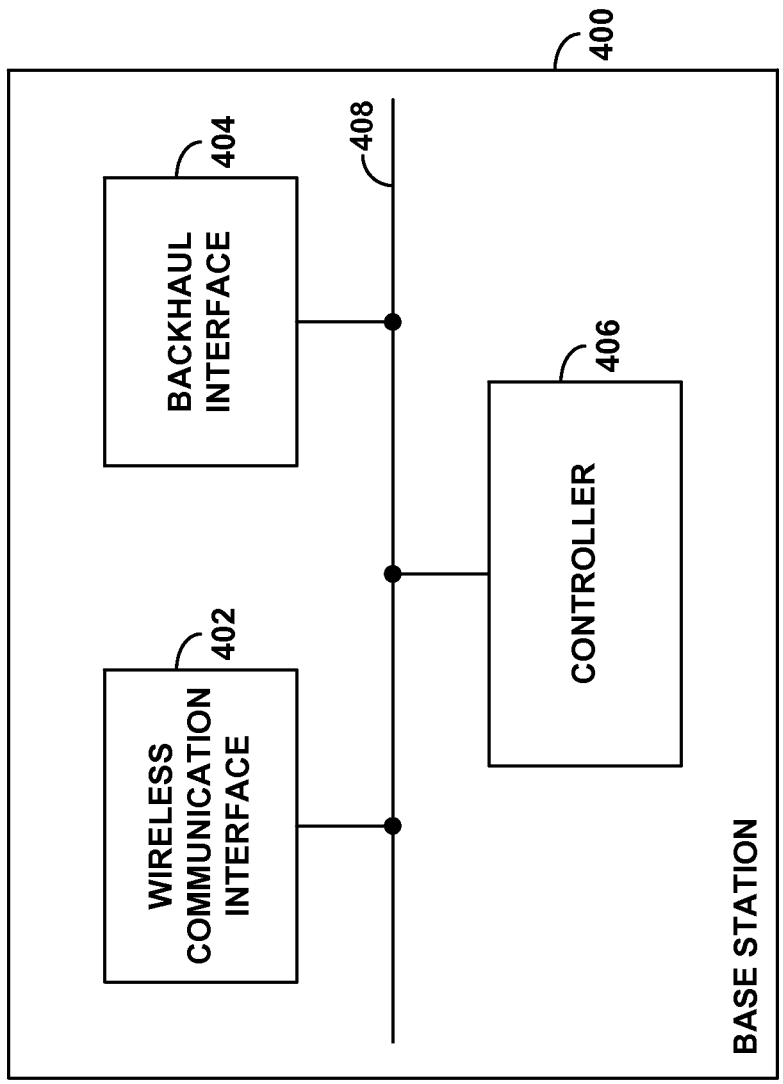
FIG. 4 is a simplified block diagram of an example base station in accordance with the disclosure.

Finally, FIG. 4 is a simplified block diagram of an example base station 400, such as eNodeB 102, eNodeB 104, or eNodeB 106, discussed above for instance. This base station 400 could take various forms, such as a macro base station of the type that typically includes an antenna tower and provides a broad range of coverage, or a small cell (e.g., femtocell) or relay, which typically has a much smaller form factor and provides a smaller range of coverage. As shown, the example base station 400 includes a wireless communication interface 402 through which to engage in communication with UEs served by the base station, a backhaul interface 404 through which to engage in communication with other base stations and with various network infrastructure, and a controller 406 configured to cause the base station to carry out various base station operations described herein, all of which may be communicatively linked together by a system bus, network, or other connection mechanism 408.

In practice, the wireless communication interface 402 may include a transceiver configured to serve UEs in accordance with one or more air interface protocols such as those noted above, along with a power amplifier and antenna structure that radiates to provide for air interface communication between the base station and served UEs. The backhaul interface 404 may then comprise a wired or wireless network communication module, such as an Ethernet interface, through which the base station can communicate with other entities.

The controller 406 may also take various forms, including various combinations of hardware, firmware, and software for instance. By way of example, the controller 406 could comprise one or more general purpose processors (e.g., microprocessors) and/or one or more special purpose processors (e.g., application specific integrated circuits), and one or more non-transitory data storage elements (e.g., magnetic, optical, and/or flash storage). The data storage could then hold program instructions executable by the processor(s) to carry out various base station operations described herein, and could further hold various reference data, such as the operational parameters and neighbor list data described above for instance.

In an example implementation, the base station 400 may be a handover source, such as eNodeB 102 described above. In such an example, controller 406 may thus be arranged to (i) transmit a first handover request to a first handover target, where the first handover request includes an indication of a quality of service level that a UE has with the handover source, (ii) receive a response from the handover target indicating that the handover target does not support the quality of service level, (iii) receive from the handover target an indication of a second handover target, where the second handover target supports the quality of service level, and (iv) transmit a second handover request to the second handover target.

In another example implementation, the base station 400 may be a first handover target, such as eNodeB 104 described above. In such an example, controller 406 may thus be arranged to (i) receive from the handover source the first handover request, (ii) determine whether the first handover target supports the quality of service level, and (iii) in response to a determination that the first handover target does not support the quality of service level, transmit an indication of the second handover target to the handover source.

In yet another example implementation, the base station 400 may be a second handover target, such as eNodeB 106 described above. In such an example, controller 406 may thus be arranged to (i) receive the second handover request from the handover source, and (ii) receive handover of the UE from being served by the handover source to being served by the second handover target.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method operable by a handover source while the handover source is serving a user equipment device (UE) with communication service at a quality of service level, the method comprising:
    determining, by the handover source, a signal strength of an air interface between the UE and a first handover target;
    based at least in part on a determination that the determined signal strength exceeds a threshold, transmitting from the handover source to the first handover target a first handover request seeking handover of the UE from being served by the handover source to being served by the first handover target, wherein the first handover request includes an indication of the quality of service level;
    receiving from the first handover target, in response to the transmitted first handover request, a response indicating that the first handover target does not support the quality of service level, the response specifying a second handover target that supports the quality of service level; and
    responsive to the response received from the first handover target, transmitting to the specified second handover target a second handover request seeking handover of the UE from being served by the handover source to being served by the second handover target.

2. The method of claim 1, wherein the handover source is a first Long Term Evolution (LTE) eNodeB, the first handover target is a second LTE eNodeB, and the second handover target is a third LTE eNodeB.

3. The method of claim 1, wherein the handover source is a first mobility management entity (MME), the first handover target is a second MME, and the second handover target is a third MME.

4. The method of claim 1, wherein the first handover request and second handover request respectively are each an S1-based handover request.

5. The method of claim 1, wherein the indication of the quality of service level is a quality of service class indicator (QCI).

6. The method of claim 1, further comprising:
    receiving at the handover source from the second handover target, in response to the second handover request, an identifier useable by the UE to engage in communication with the second handover target; and
    transmitting from the handover source to the UE the received identifier.

7. The method of claim 1, further comprising:
    selecting the first handover target from a neighbor list useable to facilitate UE handover,
    wherein transmitting the first handover request to the first handover target comprises transmitting the first handover request to the selected first handover target.

8. The method of claim 7, wherein the neighbor list does not include the second handover target.

9. A first serving system comprising:
    a wireless communication interface configured to communicate with a user equipment device (UE) over an air interface at a quality of service level;
    a processing unit;
    data storage; and
    program instructions stored in the data storage and executable by the processing unit to carry out operations comprising:
        determining, by the first serving system, a signal strength of an air interface between the UE and a second serving system;
        based at least in part on a determination that the determined signal strength exceeds a threshold, transmitting from the first serving system to a the second serving system a first handover request seeking handover of the UE from being served by the first serving system to being served by the second serving system, wherein the first handover request includes an indication of the quality of service level;
        receiving from the second serving system, in response to the transmitted first handover request, a response indicating that the second serving system does not support the quality of service level, the response specifying a third serving system that supports the quality of service level; and
        responsive to the response received from the second serving system, transmitting to the specified third serving system a second handover request seeking handover of the UE from being served by the first serving system to being served by the third serving system.

10. The first serving system of claim 9, wherein the first serving system includes a first Long Term Evolution (LTE) eNodeB, the second serving system includes a second LTE eNodeB, and the third serving system includes a third LTE eNodeB.

11. The first serving system of claim 10, wherein the first serving system further includes a first mobility management entity (MME), the second serving system includes a second MME, and the third serving system includes a third MME.

12. The first serving system of claim 9, wherein the operations further comprise:

receiving from the third serving system, in response to the second handover request, an identifier useable by the UE to engage in communication with the third serving system; and transmitting the received identifier to the UE.

13. The first serving system of claim 9, wherein the operations further comprise:

selecting the second serving system from a neighbor list useable to facilitate UE handover, wherein transmitting the first handover request to the second serving system comprises transmitting the first handover request to the selected second serving system.

14. The first serving system of claim 13, wherein the neighbor list does not include the third serving system.

15. A wireless communication system comprising:

a first base station for providing first cellular coverage in which to serve user equipment devices (UEs);

a second base station for providing second cellular coverage in which to serve UEs; and a third base station for providing third cellular coverage in which to serve UEs, wherein the first base station serves a UE at a quality of service level, and wherein the first base station includes a first controller configured to (i) determine a signal strength of an air interface between the UE and the second base station, (ii) based at least in part on a determination that the determined signal strength exceeds a threshold, transmit a first handover request to the second base station, wherein the first handover request includes an indication of the quality of service level, (iii) receive a response from the second base station indicating that the second base station does not support the quality of service level, (iv) receive from the second base station an indication of the third base station, wherein the third base station supports the quality of service level, and (v) transmit a second handover request to the third base station, wherein the second base station includes a second controller configured to (i) receive from the first base station the first handover request, (ii) determine whether the second base station supports the quality of service level, and (iii) in response to a determination that the second base station does not support the quality of service level, transmit the indication of the third base station to the first base station, and wherein the third base station includes a third controller configured to (i) receive the second handover request from the first base station, and (ii) receive handover of the UE from being served by the first base station to being served by the third base station.

16. The wireless communication system of claim 15, wherein the first base station is a first Long Term Evolution (LTE) eNodeB, the second base station is a second LTE eNodeB, and the third base station is a third LTE eNodeB.

17. The wireless communication system of claim 15, wherein the indication of the quality of service level is a quality of service class indicator (QCI).

18. The wireless communication system of claim 15, wherein the controller is further configured to:

receive from the third controller, in response to the second handover request, an identifier useable by the UE to engage in communication with the third base station; and transmit the received identifier to the UE.

\* \* \* \* \*